United States Patent [19]

Canalini

[11] Patent Number: 5,039,784

[45] Date of Patent: Aug. 13, 1991

[54] PROCESS FOR AN ANIONIC MELT POLYMERIZATION OF CAPROLACTAM WITH INITIATOR, ACTIVATOR, COADJUVANT AND DISPERSING MEDIUM

[76] Inventor: Giovanni Canalini, Via Agadir, 10/A, 20097 San Donato Milanese M1, Italy

[21] Appl. No.: 440,974

[22] Filed: Nov. 22, 1989

Related U.S. Application Data

[63] Continuation-in-part of Ser. No. 83,638, Aug. 7, 1987, abandoned.

[30] Foreign Application Priority Data

Aug. 14, 1986 [IT] Italy .................................. 21488 A/86

[51] Int. Cl.$^5$ .............................................. C08G 69/18
[52] U.S. Cl. ...................................... 528/312; 524/606; 525/178; 525/183; 525/184; 525/421; 525/424; 525/426; 528/323; 528/325; 528/326
[58] Field of Search ............... 528/312, 323, 326, 325; 525/421, 426, 424, 178, 183, 184; 524/606

[56] References Cited

U.S. PATENT DOCUMENTS

| | | | |
|---|---|---|---|
| 3,017,391 | 1/1962 | Mottus et al. ......................... | 260/78 |
| 3,061,592 | 10/1962 | Schnell et al. ....................... | 528/312 |
| 3,298,977 | 1/1967 | Robertson ............................ | 528/312 |
| 3,910,861 | 10/1975 | Wolvers et al. ...................... | 260/78 |
| 4,017,465 | 4/1977 | Bacskai ............................... | 528/312 |
| 4,309,530 | 1/1982 | Bour et al. .......................... | 528/312 |

Primary Examiner—Harold D. Anderson
Attorney, Agent, or Firm—Collard, Roe & Galgano

[57] ABSTRACT

A process for the continuous and discontinuous production of polycaprolactam is disclosed which includes the step of polymerizing, by anionic polymerization, ε-caprolactam to which suitable initiators and activators are added. The process may optionally include the addition of comonomers, pigments, electroconductive fillers, modifying polymers, inorganic fillers, reinforcing fibers, inorganic fillers and/or other additives to a dispersing media in which the polymerization takes place with polycaprolctam, copolymers or composites thereof being obtained in the form of particles. The foregoing additives may, for example, be added to the dispersing media dropwise with mechanical or convective stirring under controlled temperature conditions. The granulometric or morphological characteristics of the particles obtained are influenced by the nature, viscosity, temperature and the rate of stirring of the dispersing medium, as well as by the rate of feed of the caprolactam and the polymerization ingredients to the dispersing media and by the geometry of the polymerization reactor.

24 Claims, 1 Drawing Sheet

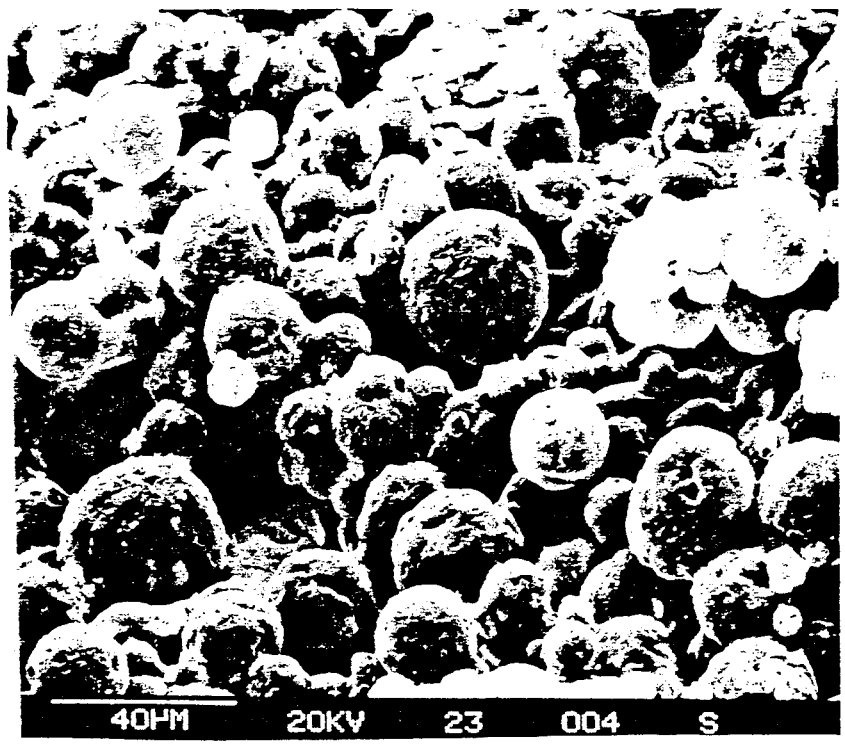
FIG. 2

PROCESS FOR AN ANIONIC MELT POLYMERIZATION OF CAPROLACTAM WITH INITIATOR, ACTIVATOR, COADJUVANT AND DISPERSING MEDIUM

BACKGROUND OF THE INVENTION

This application is a continuation-in-part of application Ser. No. 083,683, filed Aug. 7, 1987, now abandoned, the disclosure of which is incorporated herein by reference.

The present invention relates a process, which may be carried out both continuously and discontinuously, for the anionic polymerization of $\epsilon$-caprolactam into polycaprolactam, its copolymers or polycaprolactam composite polymers, obtained by means of, for example, a dropwise addition, or other method of addition, to a dispersing media.

It is generally known in the art that polycaprolactam is an aliphatic polyamide, more commonly known as Nylon 6, which has traditionally been used in the textile and other industrial fields. The wide usage of polycaprolactam is due, in part, to its optimum dyeability in textile pieces and to its optimum balance of physical-mechanical properties. Polycaprolactam is generally supplied in industry in the form of various types of granules, depending upon its molecular weight and/or its viscosity.

The polycondensation process presently known to the art is undoubtedly the only process in use for the production of Polyamide 6 for textile uses, for filming applications and for the injection molding of finished articles for various techincal sectors. This known process necessarily results in high energy costs both during the polymerization step (e.g., carried out at temepratures higher than 200° C.) and as a result of post-polymerization costs, when the polymer is maintained at the temperature of incipient melting for the purpose of securing an upgrading of the polymer for increasing its viscosity.

The industrial yield from this process is generally lower than 90% of the polymerized polycaprolatam so that a series of washes is required for removing the monomer and lower polymers from the desired polymer.

A further energy expenditure is associated with the drying step of the known polycondensation process.

Upon consideration of the melting point of Polyamide 6, which is in excess of 215° C., and the above-mentioned very favorable balance of physical-mechanical characteristics of this polymer, Polyamide 6 is used as a polymeric matrix, together with fillers and/or reinforcing additives, for the purpose of improving its use in technical sectors wherein the finished articles therefrom operate at high working temperatures.

Since Polyamide 6 is an organic compound, it requires, as all organic polymers do, a suitable stabilization for the purpose of improving its operating life. Furthermore, for aesthetic reasons, organic and/or inorganic pigments are often added to Polyamide 6.

During the polycondensation polymerization process of the prior art, the addition of certain additives and/or pigments, without impairing the kinetics of polymerization, is not always possible. Producing reinforced or filled Polyamide 6 composites directly during the polycondensation polymerization procedures of the prior art are virtually impossible.

Normally, when Polyamide 6 must be dyed, stabilized, modified, filled and/or reinforced, melt-blending operations are necessary and are carried out on suitable extruders during which pigments, additives, modifiers, fillers and reinforcing additives are dispersed throughout the polymeric matrix by melting it.

Such a process, normally referred to as "compounding," requires a considerable expenditure for facilities, as well as a significant energy expenditure (approx. 0.2–0.8 kWh/kg) for heating Polyamide 6 to a temperature higher than its melting point (which is within the range of from 230° C. to 300° C.) The high temperature requirement, necessary for obtaining optimum values of the melt viscosity for a good dispersion of the materials different from the polymer (e.g., additives, pigments, modifying polymers, fillers and reinforcing additives), favors the undesired phenomena of degradation with a consequential worsening of the physical-mechanical properties of the Polyamide 6.

SUMMARY OF THE INVENTION

It is, therefore an object of the present invention to provide a process for the production of Polyamide 6, copolymers and composites thereof, which can be obtained by polymerizing $\epsilon$-caprolactam (either by itself or with its copolymers) directly within a suitable dispersing media, by means of an anionic polymerization procedure, to be carried out at relatively low temperatures, after a preliminary incorporation into the molten caprolactam, of activators of anionic polymerization (e.g. precursors and mono- and polyfunctional activators of polymerization), lactams with a differing number of carbon atoms relative to caprolactam, additives, pigments, modifiers (including polymeric modifiers), and organic and inorganic fillers with diffeent morphological characteristics.

It is a further object of the present invention to provide an improved process for the anionic polymerization of caprolactam, having a uniform density and distribution of coadjuvants and being of substantially spherical shape, rather than structures of non-uniform density having an irregular or non-spherical shape.

It is, yet a further object of the present invention to provide polymer and copolymer products of caprolactam, which include granules of substantially spherical shape and uniform density and distribution of coadjuvant throughout the polymer product, which allow for additional applications of such regularly shaped products, as opposed to the irregularly shaped products known to the prior art, such as extrusion fiber formation, etc.

The foregoing and related objects are achieved by the present invention wherein an anionic polymerization of polycaprolactam, in dispersion, preferably takes place at a temperature within the range of from 70° C. to 200° C. (more preferably within the range of 100° C. to 200° C.), wherein the morphology of particles of the polymer obtained further depends upon the foregoing polymerization temperature.

The polymerization in dispersion of caprolactam preferably takes place in the presence of catalytic system constituted by initiators of anionic polymerization of, for example, the type of:

lactamates of various metals or their precursors, such as, for example, alkali metals or alkaliline earth metals, their hydrides boron-hydrides, oxides, hydroxides, organo-derivatives, etc.; and, Grignard reactants, and/or by activators of anionic polymerization of, for example, the type of:

N-acyllactams and related precursors; and
N-carbamoyllactams and related precursors.

It should be understood that the foregoing types of activators and initiators are intended to be illustrative of the types of activators and initiators which may be employed in the foregoing anionic polymerization. The foregoing listing is not intended to be exclusive.

The activators utilizwed may be either mono- or polyfunctional. The metal caprolactamate, to which an activator has been added in a suitable stoichiometric ratio, is precolated into a suitable dispersing medium. The activator is preferably added by stirring, however, other means of introducing the activator to the metal caprolactamate may be employed with all such additional means being encompassed within the scope of the present invention.

It is to be understood that the dispersing medium, as per the present invention, may be any organic compound in a liquid state, which has a very low viscosity at a temperature within the range of from 100° C. to 200° C. The dispersing medium is to be totally immiscible with the molten caprolactam and non-solvent for polycarprolactam, copolymers and composites thereof.

Dispersing agents of the type which may be utilized in connection with the present invention include, but are not limited to:

aliphatic, alicyclic and aromatic hydrocarbons and their mixtures;
linear and branched polyethylenic waxes;
amorphous (atactic) polypropylene;
hydrocarbons of various molecular weights, which may be either straight-chained or have functional groups.

The dispersing agent may contain (depending upon reaction conditions derived from the kinetics of the anionic polymerization, as well as from the morphological characteristics of the polymer particles:) agents capable of stabilizing the dispersion-by preventing or reducing the coagulation of the particles of the polymer and optimizing the distribution of the dimensions and the surface state of the "drops" of caprolactam-activated and initiated for the anionic polymerization, as well as of the particles of Polyamide 6.

Stabilizing agents for the dispersing medium (i.e., polymerization medium) may be, by way of example:

non-ionic surfactants; and,
surfactants.

In the activated caprolactam salt, compounds may be dissolved, dispersed or added during the precolation step, or by other means contacted with the dispersing medium, such compounds may be reactive or inert and include, but are not limited to:

moisture sequestering agents;
organic or inorganic compounds;
pigments;
other polymers such as, for example, nitrile elastomers, polyurethane elastomers or polyolefinic elastomers;
comonomers from pyrrolidone, having 4 carbon atoms, to lauryllactam, having 12 carbons atoms;
fillers such as, for example, talc, carbonates, kaolin, mica, wollastonite, titanates, glass beads, carbon blacks, etc.; and,
reinforcing agents such as, for example, fiberglass, carbon fibers, organic fibers, wiskers, asbestos, etc.

organic or inorganic compounds;
pigments;
other polymers such as, for example, nitrile elastomers, polyurethane elastomers or polyolefinic elastomers;
comonomers from pyrrolidone, having 4 carbon atoms, to lauryllactam, having 12 carbons atoms;
fillers such as, for example, talc, carbonates, kaolin, mica, wollastonite, titanates, glass beads, carbons blacks, etc.; and,
reinforcing agents such as, for example, fiberglass, carbon fibers, organic fibers, wiskers, asbestos, etc.

The process of the present invention is endowed with the following advantages, among others:

high versatility, e.g., Polyamide 6, its copolymers, polymeric alloys and composites are obtained in a one-step procedure with the compounding procedure of the prior art having been eliminated;
very fast, e.g., polycaprolactam and its derivatives are obtained within very short time periods which are, in part, a function of the efficiency of the activators utilized;
very efficacious, e.g., yields obtained are in excess of 95% of ε-caprolactam converted into polycaprolactam; and,
very inexpensive in terms of energy costs inasmuch as during the sole step of anionic polymerization in dispersion:
a) a high-yield polymer with no required upgrading, in fact the addition of adequate cross-linking agents allows for a wide range of viscosities to be obtained;
b) high-yield copolymers;
c) already prepared mass-pigmented polymers;
d) polymeric alloys;
e) polymers with pre-set stability;
f) composites, are obtained.

The foregoing may all be obtained by eliminating the traditional steps of melt-homogenization on extruder.

According to the process of the present invention, polymers constituted by particles having a very peculiar shape are obtained, as will be explained in greater detail hereinafter, which cannot be obtained by way of the known prior art techniques of grinding and/or atomizing.

BRIEF DESCRIPTION OF THE DRAWINGS

The present invention will now be described in greater detail by way of example and presentation of preferred embodiments, with reference being made to the accompanying drawing figures, wherein:

FIG. 1 shows a Polyamide 6, having a shape which is highly irregular, obtained by a polymerization process according to a process known to the prior art; and FIG. 2 shows Polyamide 6, having a substantially spherical shape, as obtained by the polymerization process according to the present invention.

DETAILED DESCRIPTION OF THE PREFERRED EMBODIMENT

Turning now, in detail, to the present invention, the usual crushing at low temperatures produces splinters of polymer having a shape highly irregular, with sharp edges and a large dimensional distribution, as evidenced by FIG. 1 (relating to an anionic Polyamide 6.) By contrast the process according to the invention provides polymers having a rounded, substantially spherical shape and may further have a uniform density and distribution of coadjuvant throughout said polymer.

As an example, FIG. 2 shows the spherical shape of Polyamide 6 (obtained by anionic polymerization according to the invention). The temperatures involved by the process of anionic polymerization of-caprolactam in dispersion, according to the present invention, are considerably lower than those used in the process of polymerization of caprolactum by polycondensation of the prior art, because said first temperatures have values within the range of from 120° C. to 180° C., preferably from 145° C. to 155° C., instead of being higher than 200° C.

With regard to the polymers composites, it undoubtedly appears that the more intimate blending of the components, which can be obtained in the molten caprolactam, before, the anionic polymerization, makes it possible to reach physical-mechanical performances better than the corresponding performances of the composites obtained by means of the melt-blending, by extrusion, of Polyamides 6 obtained by the polycondensation process.

The process of the present invention is accomplished by taking care to carry out all the operations of the production of metal caprolactamate, preparation of possible comonomers, preparation of the activator, preparation of the various modifier ingredients, preparation of the dispersing medium and washing of the obtained polymer, under an inert gas atmosphere, for the purpose of preventing competitive, noxious reactions and detrimental poisoning of the reaction of anionic polymerization.

Particular attention should be devoted to the elimination of water which causes inhibitions of the reactions kinetics, even when present in trace amounts (e.g., 10 ppm).

In a preferred embodiment of the process of the present invention, the process for the anionic production of poly epsilon-caprolactam includes the steps of:

melting epsilon caprolactam monomer at a temperature of from 70°–150° C.;
dividing the molten epsilon caprolactam monomer into a first portion and a second portion;
adding an intiator of anionic polymerization to the first portion, under stirring;
adding an activator of anionic polymerization to the second portion, under stirring;
adding a coadjuvant to the first portion only or to the second portion only or to both the first portion and the second portion;
mixing the first portion and the second portion with one another;
immediately introducing the mixture obtained in the mixing step into a dispersing medium and a non-solvent for the polymer to form a dispersed mixture; and
polymerizing the dispersed mixture at a temperature of from 120°–200° C. with stirring to form a polymer reaction product.

The polymer reaction product thereby obtained may then be filtered, washed and dried so as to form a powdered polymer product.

In a preferred embodiment of the present invention for a process for an anionic production of a copolymer of epsilon-caprolactam, such process includes the steps of:

melting a mixture which includes an epsilon-caprolactam monomer and a lactam monomer selected from the group consisting of pyrrolidone and lauryllactam, at a temperature of from 70° C.–150° C.;
dividing the mixture obtained in the melting step into a first portion and a second portion;
adding an initiator of anionic polymerization to the first portion, under stirring;
adding an activator of anionic polymerization to the second portion, under stirring;
adding a coadjuvant to the first portion only or to said second portion only or to both the first portion and the second portion;
mixing the first portion and the second portion with one another;
immediately introducing the mixture obtained in the mixing step into a dispersing medium totally immiscible with the mixture of molten monomers and a non-solvent for the copolymer to form a dispersed mixture; and,
polymerizing the dispersed mixture at a temperature of from 120°–200° C., with stirring, to form a polymer reaction product.

The polymer reaction product thereby obtained may then be filtered, washed and dried so as to form a powdered polymer product.

The process of the present invention, as discussed above, yields a polymer product which includes having a uniform density and substantially rounded shape, in contrast to the polymer product obtained via the polycondensation process of the prior art.

More particularly, by the process of the present invention there occurs the formation of drops of monomer homogeneously dispersed in the dispersing medium. This occurs by a percolating of the pre-mixed reactive components in the dispersing medium and thereby makes it possible for a polymerization to be carried out which locally, i.e., inside each individual drop, is a mass polymerization, but which can be carried out under rigorously isothermal conditions. This is, in part, due to the small size of the drops and to the effect of the dispersing liquid, which acts as a thermal stabilizer. Thus, the known negative effects of overheating results in the formation of irregular structures (i.e., structures not having a uniform density or substantially rounded shape), gels, chromphor groups, branching, etc., of the caprolactam; such is overcome by the process of the present invention. As previously discussed, the process of the invention is carried out in a very rapid polymerization reaction, with a very short residence time, in the strongly basic medium at relatively high temperatures. The process of the invention thereby yields an improved polyamide product.

The present invention will now be further disclosed by reference to the following example, which is supplied solely for the purpose of illustration and is not intended as defining the limits and scope of the present invention.

EXAMPLE

To a first tightly sealed vessel, equipped with a stirrer, caprolactam was charged and through it absolutely anhydrous nitrogen was countercurrently bubbled, with stirring, at the temperature of 85° C. A suitable vacuum system, such as a vacuum pump, made it possible for the moisture contained in the caprolactam to be stripped.

From said first vessel, by means of a piston cylinder, molten and anhydrous caprolactam was drawn, and was conveyed to a second vessel and to a third vessel, under a nitrogen atmosphere.

Inside said second vessel, caprolactam was heated to 110° C., with stirring, and to it NaH, as the initiator, was added, in the amount of 0.3% by mole, relative to caprolactam. The exothermic reaction of formation of sodium caprolactamate requires that the temperature inside said second vessel be controlled during the hydrogen evolution consequent to the formation of the salt. The salt was maintained at a temperature of about 130° C.

By a suitable pump and three-way valve, sodium caprolactamate was continuously circulated.

Inside the third vessel, to the anhydrous caprolactam drawn from the first vessel, an activator was added, and N-acetylcaprolactam was then prepared, and subsequently kept at approximately 110° C., with circulation through a loop closed on itself, through a three-way valve.

Subsequently, sodium caprolactamate and N-acetylcaprolactam were delivered to a suitable blending head, to be combined with each other, with N-acetylcaprolactam being fed in a molar amount of 0.7% relative to caprolactam.

From the blending head, maintained at the controlled temperature of 110° C., the mixture was percolated on amorphous, low-molecular-weight, polypropylenes at 155° C., as the dispersing medium, kept moving inside a further vessel having a tube-shaped structure, by means of a low-pressure bubbling of almost perfectly anhydrous nitrogen.

The formation of polycaprolactam powder, of rather homogeneous size, was verified about 90 seconds after contact with the dispersing medium.

The slow dropping, carried out by gravity, ensured the nearly total conversion of caprolactam into polycaprolactam.

After being separated, the polymer powder was washed with anhydrous n-hexane, for the purpose of eliminating the atactic polypropylene, and was then dried.

While only several embodiments of the present invention have been shown and described, it will be obvious to those of ordinary skill in the art that many modifications may be made to the present invention without departing from the spirit and scope thereof.

What is claimed is:

1. A process for an anionic production of poly epsiloncaprolactam, comprising the steps of:
   melting epsilon caprolactam monomer at a temperature of from 70°-150° C.;
   dividing the molten epsilon caprolactam monomer into a first portion and a second portion;
   adding an initiator of anionic polymerization to said first portion, under stirring;
   adding an activator of anionic polymerization to said second portion, under stirring;
   adding a coadjuvant to said first portion only or to said second portion only or to both said first portion and said second portion;
   mixing said first portion and said second portion with one another;
   immediately introducing the mixture obtained in said mixing step into a dispersing medium and a non-solvent for the polymer to form a dispersed mixture;
   polymerizing said dispersed mixture at a temperature of from 120°-200° C. with stirring to form a polymer reaction product; and,
   filtering, washing and drying said polymer reaction product in order to form a polymer product.

2. The process according to claim 1, wherein said dispersing medium is a member selected from the group consisting of linear polyethylenic wax, branched polyethylenic wax, a polyolefin and an amorphous polypropylene.

3. The process according to claim 1, wherein said initiator of said anionic polymerization is selected from the group consisting of a lactamate of a metal, an alkali metal, an alkaline earth metal, a hydride, an oxide, an hydroxide, an organo-derivative of an alkali metal, and a Grignard reagent.

4. The process according to claim 1, wherein said activators of said anionic polymerization are monofunctional and are selected from the group consisting of an N-acyl-lactam, a precursor of an N-acyl-lactam, an N-carbamoyllactam, and a precursor of an N-carbamoyllactam.

5. The process according to claim 1, wherein said activators of said anionic polymerization are polyfunctional and are selected from the group consisting of an N-acyl-lactam, a precursor of an N-acyl-lactam, an N-carbamoyllactam, and a precursor of an N-carbamoyllactam.

6. The process according to claim 1, wherein said coadjuvant is a pigment.

7. The process according to claim 1, wherein said coadjuvant is an inert filler.

8. The process according to claim 1, wherein said coadjuvant is a reinforcing agent.

9. The process according to claim 1, wherein said coadjuvant is a powdered polymer selected from the group consisting of a polyolefinic elastomer, a polyurethane elastomer and a nitrile elastomer.

10. The process according to claim 1, wherein said polymer product is in powdered form.

11. A process for an anionic production of a copolymer of epsilon-caprolactam, comprising the steps of:
    melting a mixture which includes an epsilon-caprolactam monomer and a lactam monomer selected from the group consisting of pyrrolidone and lauryllactam, at a temperature of from 70°-150° C.;
    dividing said mixture obtained in said melting step into a first portion and a second portion;
    adding an initiator of anionic polymerization to said first portion, under stirring;
    adding an activator of anionic polymerization to said second portion, under stirring;
    adding a coadjuvant to said first portion only or to said second portion only or to both said first portion and said second portion;
    mixing said first portion and said second portion with one another;
    immediately introducing the mixture obtained in said mixing step into a dispersing medium totally immiscible with said mixture of molten monomers and a non-solvent for the copolymer to form a dispersed mixture;
    polymerizing said dispersed mixture at a temperature of from 120°-200° C. with stirring to form a polymer reaction product; and,
    filtering, washing and drying said polymer reaction product in order to form a polymer product.

12. The process according to claim 11, wherein said dispersing medium is a member selected from the group consisting of linear polyethylenic wax, branched polyethylenic wax, a polyolefin and an amorphous polypropylene.

13. The process according to claim 11, wherein said initiator of said anionic polymerization is selected from the group consisting of a lactamate of a metal, an alkali metal, an alkaline earth metal, a hydride, an oxide, an hydroxide, an organo-derivative of an alkali metal, and a Grignard reagent.

14. The process according to claim 11, wherein said activators of said anionic polymerization are monofunctional and are selected from the group consisting of an N-acyl-lactam, a precursor of an N-acyl-lactam, an N-carbamoyllactam, and a precursor of an N-carbamoyllactam.

15. The process according to claim 11, wherein said activators of said anionic polymerization are polyfunctional and are selected from the group consisting of an N-acyl-lactam, a precursor of an N-acyl-lactam, an N-carbamoyllactam, and a precursor of an N-carbamoyllactam.

16. The process according to claim 11, wherein said coadjuvant is a pigment.

17. The process according to claim 11, wherein said coadjuvant is an inert filler.

18. The process according to claim 11, wherein said coadjuvant is a reinforcing agent.

19. The process according to claim 11, wherein said coadjuvant is a powdered polymer selected from the group consisting of a polyolefinic elastomer, a polyurethane elastomer and a nitrile elastomer.

20. The process according to claim 11, wherein said polymer product is in powdered form.

21. The polymer of epsilon-caprolactam having granules of substantially spherical shape and uniform density and distribution of coadjuvant throughout said polymer, produced according to the process of claim 1.

22. The copolymer of epsilon-caprolactam having granules of substantially spherical shape and uniform density and distribution of coadjuvant throughout said polymer, produced according to the process of claim 1.

23. The polymer of epsilon-caprolactam having granules of substantially spherical shape and uniform density and distribution of coadjuvant throughout said polymer, produced according to the process of claim 11.

24. The copolymer of epsilon-caprolactam having granules of substantially spherical shape and uniform density and distribution of coadjuvant throughout said polymer, produced according to the process of claim 11.

* * * * *